US005229201A

United States Patent [19]

Blanco

[11] Patent Number: 5,229,201

[45] Date of Patent: Jul. 20, 1993

[54] WET PRINTED DECAL ON POROUS SURFACES SUCH AS CANVAS

[75] Inventor: Louis A. Blanco, Eastchester, N.Y.

[73] Assignee: Commercial Decal, Inc., Mt. Vernon, N.Y.

[21] Appl. No.: 703,902

[22] Filed: May 22, 1991

[51] Int. Cl.[5] .......................... B32B 3/12; B32B 5/16; B32B 27/14

[52] U.S. Cl. .................................... 428/284; 428/196; 428/204; 428/207; 428/246; 428/252; 428/286; 428/319.9; 428/326; 428/914

[58] Field of Search ............... 428/196, 204, 207, 246, 428/252, 284, 286, 319.9, 326, 914

[56] References Cited

U.S. PATENT DOCUMENTS 3,344,012 9/1967 Strom ................................ 428/202
3,772,049 11/1973 Blanco et al. ....................... 106/184
4,107,365 8/1878 Reed et al. .......................... 428/202
5,032,449 7/1991 Strom ................................ 428/195
5,098,772 3/1992 Strom ................................ 428/914
5,132,165 7/1992 Blanco ................................ 428/914

*Primary Examiner*—George F. Lesmes
*Assistant Examiner*—Kathryne Shelborne
*Attorney, Agent, or Firm*—Lerner, David, Littenberg, Krumholz & Mentlik

[57] ABSTRACT

Methods for applying decalcomanias to various porous surfaces, including textile surfaces such as canvases, are disclosed, including applying a bonding agent to the porous surface, providing a water slide-off decalcomania, including a backing sheet with a water-soluble coating, a first coating layer on the backing sheet, a design layer, and a second coating layer disposed on the design layer, and applying the decalcomania to the bonding agent.

9 Claims, 1 Drawing Sheet

WET PRINTED DECAL ON POROUS SURFACES SUCH AS CANVAS

FIELD OF THE INVENTION

The present invention relates to methods of applying decalcomanias. More particularly, the present invention relates to methods for applying decalcomanias to porous surfaces. Still more particularly, the present invention relates to applying decalcomanias to textile surfaces. More particularly, the present invention relates to decorated surfaces, such as canvas and other porous surfaces, and to techniques for creating such decorated surfaces.

BACKGROUND OF THE INVENTION

The field of decalcomanias or "decals" has developed over the years in a variety of different areas. However, on an overall basis, most of these decals share a number of significant similarities, while specific decalcomanias will employ quite different compositions depending upon their ultimate intended use.

As for the decalcomanias themselves, they generally comprise a multi-layered structure which includes a backing sheet, a design or pigment layer, and a protective layer applied thereover. The colors in the design layer can be formed from various inorganic pigments or oxides, and can be applied by a number of methods. Generally, a layer is required to facilitate release of the backing layer from the design layer, and is thus interposed therebetween for that very purpose. In addition, the protective layer which is applied over the design layer can comprise low melting point glass or glass fluxes, which act as protective barriers over the surface of the design layer.

In the case where these decalcomanias have constituted a paper backing, a pigment layer, and an organic or lacquer layer, removal of the decalcomania from the paper backing may be carried out by merely moistening the decalcomania and sliding the decorated portion off the paper backing. Where water is used for this purpose, the decalcomania is called a water-mount or slide-off decalcomania. Where the decalcomanias are mounted with a solvent, they are called a solvent-mount type. One such decalcomania is described in U.S. Pat. No. 3,772,049, in which a bonding agent is employed for the purpose of facilitating the glazing and fixing of ceramic wares. Thus, a combination of a fast-acting solvent, such as a lower alcohol, and a moderating agent, such as various polyhydroxy compounds, including various glycols, are employed for these purposes. While in the case of the '049 patent the disclosure strictly relates to application of the decalcomania to ceramic ware, it is not believed that decalcomanias of the water-mount or slide-off type have been previously applied to porous surfaces, such as textile surfaces and the like. However, it is believed that decalcomanias of the solvent-mount type have been previously applied to textile supports such as canvas, as well as to other surfaces, such as wood and the like. In fact, the assignee of the present application, Commercial Decal, Inc., made and sold commercially such solvent-mount-type decals, which were primarily applied to biscuit ware, which was then glazed and fired. In particular, with these decals, application generally took place by stripping a backing layer from the tissue surface thereof, and then dipping the decal into a solution of pine oil, butyl carbitol, carbitol solvent and water. The tissue material could then be placed face down onto the ware, dried, and then moistened in order to remove the tissue itself.

In general the transfer of designs to textiles has been accomplished by the use of sublimation dyes which are transferred by the application of heat from a paper backing directly on to the textile supports in question. In the past, however, where it has been attempted to apply solvent-mount decals to textile supports such as canvas, these attempts have included printing the decals onto dextrine-coated paper and then immersing the decal in an aqueous solution containing from 5 to 15% butyl Cellosolve® (trademark of Union Carbide corporation) in which the solvent softens the design layer, causing the same to become tacky so that it will adhere to the textile support. The decalcomania is then placed face down on the canvas and squeegeed to remove excess solvent and water, and the backing is then peeled away as the design is fixed to the canvas. Use of solvent-mounted decals, however, results in immediate adherence to the textile.

A rather significant proportion of the decalcomania industry is directed to ceramic decalcomanias, which are intended for application to ceramic wares, and which thus inherently include firing steps. These, in turn, create specific requirements for the decalcomanias themselves so that they will not be destroyed and/or interfere with the decoration process when high temperatures are applied thereto. In addition, decals have also been known and used for years which are not intended to be fired, as is the case with glass and ceramic applications. In these cases, so-called cold decals have been used, be they of the pressure-sensitive, water-slide-off, or solvent-mount type. All of these decals thus exclusively employ organic colors.

While most of the prior applications of decalcomanias have thus been in connection with ceramic wares, in that context various techniques have been developed for printing and applying these decals. Apart from the aforementioned U.S. Pat. No. 3,722,049, reference is also made to British Patent No. 1,094,104 to Johnson, Mathey & Co., which discloses ceramic pigment transfers including inks with a printing medium or varnish incorporating a ceramic pigment applied to a backing sheet over which a covering layer of an adhesion promoting flux of glass forming constituents is applied. This patent disclosure states that the covering layer can be fused to form a protective layer after firing, and that the flux itself can include constituents which are adapted to form a lead borosilicate glass, such as lead oxide, boric acid, and silica. In addition, in accordance with the teachings of U.S. Pat. No. 3,898,362, which is assigned to the assignee of the present application, improved wet printing techniques are disclosed in which overglaze ceramic decalcomanias are provided with a wet ink formulation free of glass and including oxide coloring agents in a liquid printing medium such as drying oil, varnish or resin. These decalcomanias are thus produced by wet printing the wet ink formulation onto a decalcomania backing sheet to form a wet design layer free of glass, and by then separately depositing onto the wet design layer a protective coating in the form of a prefused glass flux, which may also be initially deposited on the backing sheet and the wet design layer printed thereover. The purpose of this is that when the decalcomania is then positioned on a ware and fired, the protective coating fuses and tightly binds the design layer to the ware. Again, most of these types of decalcomanias include various elements such as glass fluxes and the like, which are specifically adapted for use with ceramic wares which are to be subjected to firing processes.

Decalcomanias have not been successfully applied to porous substrates such as textile media, including canvas substrates. Thus, much of the prior art, which is directed to ceramic decalcomanias and the like, does not even apply to such processes.

SUMMARY OF THE INVENTION

In accordance with the present invention, a method has now been devised for applying a water slide-off decalcomania to a porous surface which comprises applying a bonding agent to the porous surface, providing a decalcomania comprising a backing sheet including a water-soluble coating thereon, a first coating layer disposed on the backing sheet, a design layer comprising at least one pigment disposed on the first coating layer, and a second coating layer disposed on the design layer, removing the backing sheet from the decalcomania by applying water to the decalcomania, and applying the decalcomania to the bonding agent. Preferably, the porous surface is a textile surface, which is preferably a canvas surface, such as acrylic fibers or acrylic-coated fibers.

In accordance with a preferred embodiment of the method of the present invention, the bonding agent includes a fast-acting solvent component, a moderating agent, and a thickening agent.

In another embodiment of the method of the present invention, applying the bonding agent to the porous surface comprises brushing the bonding agent onto the porous surface.

In accordance with another embodiment of the method of the present invention, the design layer comprising at least one pigment is applied by means of a wet printing vehicle, preferably one having a viscosity of less than about 45 Stokes.

In accordance with the decorated porous surfaces of the present invention, these decorated surfaces include a porous substrate, a layer of bonding agent disposed on the porous surface, a decalcomania disposed on the layer of bonding agent, the decalcomania including a first coating layer absorbed at least partially into the porous surface, a design layer comprising at least one pigment disposed on the first coating layer, and a second coating layer disposed on the design layer.

In accordance with a preferred embodiment of the decorated porous surfaces of the present invention, the porous surfaces comprise a textile surface, preferably the canvas surfaces referred to above.

BRIEF DESCRIPTION OF THE DRAWINGS

A more complete understanding of the nature and substance of the present invention may be obtained with reference to the following detailed description, and with further reference to the drawings in which.

DETAILED DESCRIPTION

Figure 1:
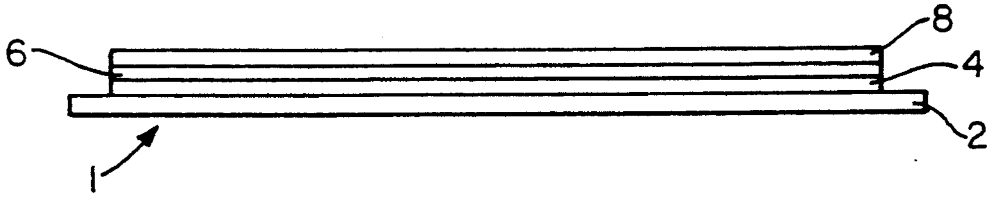
FIG. 1 is a side, elevational, sectional view of a decalcomania in accordance with the present invention.
Figure 2:
FIG. 2 is a side, elevational, sectional view of the decalcomania of the present invention as applied to a porous substrate.

Attempts to apply conventional decalcomanias directly onto porous surfaces, such as wood, masonite, stone, and various textile surfaces, and including canvas surfaces, have not proven to be successful. Thus, these decalcomanias will not become "fixed" to these surfaces, as is the case with non-porous or impervious substrates such as glazed ceramic surfaces and glass, and will generally not be sufficiently absorbed into these surfaces to a sufficient extent in order to provide an acceptable product. It has been found, however, that by employing a particular bonding agent of the present invention in combination with a particular absorbent substrate, the combination specifically selected so that the particular surface can be softened by contact with the particular bonding agent, and preferably which also tends to soften the first layer or "downcoat" of the decalcomania itself, application of the decalcomania to the substrate is enabled, and absorption into its surface is greatly facilitated so as to provide an acceptable product.

The particular porous surfaces to which the decalcomanias of this invention can now be applied generally have a porosity of at least about 10%, and preferably greater than about 15%. Thus, the substrates to which the decalcomanias of the present invention may be applied are quite varied. They include, for example, wood, masonite and various textiles, such as canvas and the like. Although these decals can be applied to wood surfaces and the like, in many instances from the standpoint of color alone this may not be desirable. That is, these substrates can generally have a rather dark color, and the decals may not then be easily seen when applied thereto. More significant is the fact that many of these substrates do have some problem with the ultimate adhesion of the decal thereto. For both of these reasons it is therefore desirable to apply a gesso material to these surfaces, including wood surfaces, prior to application of the decal thereto. Besides comprising a generally white background, these gesso surfaces comprise plaster of paris or gypsum which is generally prepared with size or glue prior to application. These materials can also comprise a mixture of calcium carbonate and glue applied to these surfaces. In addition, when the porous surface, such as wood surface, is too porous, or has an absorption of greater than about 25%, it may also then be desirable to apply a sealing layer, again with a material such as gesso or some other sealant or primer, in order to seal these surfaces prior to application of the decal thereto.

When the particular substrate which is to be decorated is a canvas substrate, that is, a conventional canvas comprising firm, closely woven cloth, which is usually linen, hemp or cotton, to be used as a surface for painting and the like, with more recent such canvases having an acrylic surface thereon. In particular, the raw cloth is generally coated with a gesso-like material which generally comprises an acrylic-titanium coating. In that case the preferred bonding agents of the present invention tend to soften this acrylic surface. These bonding agents include a number of compounds which act as a solvent for the surface coating on the canvas, i.e., the acrylic compounds. In that case the bonding agents can thus include a fast-acting solvent component, a moderating agent and a thickening agent, along with water. The purpose of the fast-acting solvent is to rapidly attack and soften the organic material comprising the media employed in the first and second coating layers, namely the organic material comprising same. The moderating agents are required, however, in order to control the speed at which the fast-acting solvents attack or soften these media. Finally, the thickening agent is required in order to permit movement or positioning of the decalcomania on the substrate before it can be moved or slid into position for proper placement thereon.

The fast-acting solvent component may be a lower alcohol, an ether alcohol, a ketone, an ester, a terpene solvent, an aliphatic hydrocarbon, an aromatic hydrocarbon, a nitrogen-containing heterocyclic compound or mixtures thereof. The lower alcohol may contain up to about 6 carbon atoms and may be aliphatic, cycloaliphatic, or heterocyclic. Some specific examples of suitable alcohols are methanol, ethanol, propanol, isopropanol, butanol, isobutanol, t-butanol, amyl alcohol, cyclohexanol, and tetrahydrofurfuryl alcohol. The ether alcohols are lower alkyl monoethers or glycols having from 2 to 8 carbon atoms. The lower alkyl substituent may have up to 6 carbon atoms. Some specific examples of suitable ether alcohols are Cellosolve® (2 ethoxy ethanol-1), Methyl Cellosolve® (2-methoxy ethanol-1), 2-propoxy ethanol-1), Butyl Cellosolve® (2-butoxy ethanol-1), hydroxy propyl Cellosolve®, 2-hexoxy ethanol-1, N-butexy prepanol, 3-methoxy propanol-1, 3-ethoxy propanol-1, 3-propoxy propanol-1, 3-butoxy propanol-1, 2-methoxy propanol-1, 2-ethoxy propanol-1, 2-propoxy propanol-1, and 2-butoxy propanol-1, Carbitol (diethylene glycol monobutyl ether). The ketones may be aliphatic or cycloaliphatic. Some specific examples are diacetone alcohol, acetone, methyl ethyl ketone and cyclohexanone. Some specific examples of esters are ethylacetate, n-butyl acetate, ethyl lactate, butyl lactate, sec-butyl acetate and secamyl acetate. Some specific examples of terpene solvents are alpha and beta penene, dipentene, p-cymene, p-menthane, alphaterpineol, and terpinolene. Examples of aliphatic hydrocarbons are Solvesso 100 and Solvesso 150. Examples of aromatic hydrocarbons are benzene, toluene and xylene. N-methyl-2-pyrrolidone is a suitable nitrogen-containing heterocyclic compound.

The moderating agent comprises a polyhydroxy compound, a secondary or tertiary terpene alcohol, for example, of the above-mentioned terpene compounds, water solubilized oils, or water. Some examples of polyhydroxy compounds are compounds containing from 2 to 12 carbon atoms, such as ethylene glycol, glycerine, prophylene glycol, butylene glycol, pentylene glycol, mentsoxythritol, trimethylol-propane, hexylene glycol, octylene decylene glycol and dodecylene glycol. The water-soluble oils are polyether derivatives of modified drying oils combined with volatile coupling agents, for example, Linaqua, a water-soluble linseed oil.

Examples of suitable thickening agents include carboxy methyl cellulose, sodium carboxymethyl cellulose, hydroxyethyl cellulose, hydroxy propyl cellulose, polyvinyl alcohol, carboxy venyl polymers, casein, acrylic resins, dextrines, alginates, gums, e.g., gum tragacanth and gum arabic.

The particular bonding agent selected for any given application can be formulated in particular in accordance with the nature of the specific organic material from which the decalcomania itself is constructed. The thickening agent is added in amounts varying from about 0.1 to 5%, and preferably from about 0.2 to 3%. The fast-acting solvent may be varied from about 8 to 50%, with from about 10 to 30% being most preferred. The moderating agent may be present in an amount varying from about 6 to 30%, with an amount of from about 8 to 20% being preferred.

The decalcomanias used in the present invention begin with a suitable backing layer 2. These specifically comprise water-mount slide-off decals. The backing thus may be of paper or other suitable material such as, for example, plastic, fabric, etc. It is most preferred that the backing comprise paper which is coated with a water-soluble release material, such as dextrine-coated paper. Other possible release materials which are water-soluble can be employed, including, for example, various cellulose derivatives, such as carboxymethyl cellulose, hydroxy propyl cellulose, sodium carboxy methyl cellulose, and the like.

These decalcomanias include a first coating layer or "downcoat" 4 which will be in direct contact with the bonding agent after it has been applied to the porous surface 10, and after the backing layer 2 has been removed from the decalcomania 1. The ideal bonding agents 12 for use in this invention will not only tend to soften the porous surface 10 when it is a textile surface or the like, but they will also tend to soften the first coating 4 layer of the decalcomania itself, thus further facilitating its application to the porous surface 10, such as the textile or canvas surface. That is, this will cause the decal to become truly bonded to the porous substrate.

The first coating layer 4 of the decalcomanias 1 used in the present invention include an absorbent component and an absorbent medium. The absorbent component is necessary in order to insure that the first coating layer 4 will dry during production of the decalcomania itself. If this layer does not dry properly, it becomes impossible to print the design layer 6 thereon in an appropriate manner. To insure such drying it is thus necessary to incorporate this absorbent component therein. The absorbent component itself can be a flux layer or a material such a starch, titanium oxide, zirconium oxide, tin oxide, zinc oxide, calcium oxide, and the like. These materials can also be used in connection with an added medium or vehicle therefor.

The flux layer may include increments of one or more of the oxides of lithium, sodium, potassium, magnesium, calcium, aluminum, cadmium, zirconium, titanium, lead, silicon, boron, and the like. The first flux layer in the first coating layer may, for example, thus be formed according to one of the following formulations:

| Ingredient | % by Wt. |
|---|---|
| Lead Oxide | 82 |
| Boric Oxide | 10.5 |
| Silicon | 7.5 |
| | 100 |
| Lead Oxide | 62.2 |
| Boric Oxide | 10.6 |
| Silicon | 23.7 |
| Alumina | 1.6 |
| Cadmium Oxide | 1.9 |
| | 100 |

The absorbent component is mixed with an absorbent medium for the absorbent component. It is this medium which will be tackified by the bonding agents of the present invention, again to ensure that the decal becomes properly bonded to the substrate. The medium itself preferably includes an acrylic resin component, preferably acrylic and methacrylic polymers and copolymers such as polybutylacrylate, methyl methacrylate/butyl methacrylate copolymer, polyethyl acrylate, polymethyl acrylate, etc. Particularly suitable are acrylic resins of the Carboset ® series (Carboset ® is a trademark of B. F. Goodrich Company), such as Carboset ® 514A, which is a 70% solution of low molecular weight acrylic copolymer in isopropyl alcohol. Acryloid resins are also potentially used, such as ethyl methacrylate copolymer B-72, and methyl methacrylate copolymer B-48N, produced by Rohm & Haas Company, Inc.

A liquid plasticizer is also preferably employed in this medium. These include the phthalates, such as dioctyl phthalate.

Preferably the absorbent medium for the first coating layer 4 also includes a cellulosic derivative, which reduces the tackiness of the acrylic resins used herein. Examples of suitable cellulosic derivatives include cellulose acetate butyrate, ethyl cellulose, methyl cellulose, nitrocellulose, etc.

Finally, the absorbent medium for the first coating layer 4 of the present invention is employed in conjunction with one or more organic solvents which will substantially dissolve all of the solids to provide a flowable, but viscous, lacquer-like consistency to the composition. Such solvents may thus include any of the known organic solvents for these components. Examples of such solvents include aromatic solvents such as any of the Solvesso ® (trademark of Exxon Corporation) line of solvents, such as Solvesso ® 150 and 100, alcohols such as butyl alcohol, and diacetone alcohol, chlorinated hydrocarbons such as trichlorobenzene, ketones such as cyclohexanon, esters such as ethyl lactate, butyl lactate and isobutyl lactate, methyl, butyl and ethyl Cellosolve ®, monomethyl ether acetate of ethylene glycol, monomethyl ether of ethylene glycol and mixtures thereof, and the like.

In preparing the decalcomnias 1 of the present invention, the first coating layer 4 described above is initially applied to a suitable backing layer 2. Since these comprise a water mount, slide off decal, the backing layer 2 preferably comprises paper which is coated with a water-soluble release material, such as dextrin-coated paper, or the other such release materials discussed above.

In order to apply the first coating layer 4 of the present invention to the backing layer 2, it is necessary to utilize a screen printing technique. Preferably, this screen printing process will employ a first coating which includes the combination of the absorbent material and the absorbent medium in a ratio of from about 1:2 to 2:1, as between the absorbent material and the medium itself, preferably between about 1:1 to 1.5:1.

A wet design layer 6 in accordance with the present invention may then be applied to the first coating layer 4 which has been deposited onto the backing layer 2. The wet design layer 6 can comprise one or more layers formed from various organic or inorganic pigments, which can be applied by a number of methods. Where organic colors are employed, the wet design layer 6 preferably comprises three or four colors, which concentrations can comprise phthalocyanine blue, quinacrodone red, carbon black, and diacrylide yellow. Where inorganic colors are utilized, the wet design layer preferably comprises three or four layers including various combinations of blue, red and yellow colors, and preferably also black, with each comprising pigments of conventional ceramic colors, namely oxides, sulfides and/or other salts of metals such as lead, cadmium, titanium, nickel, chromium, cobalt, iron, selenium, aluminum and the like. Preferably, oxide colorants are employed, but in any event these colorants or pigments are combined with a printing medium or vehicle, without a glass flux or binder therein. The ink should thus contain from about 60 to about 80 wt. %, preferably from about 70 to about 75 wt. % of the thereof.

The nature of the printing medium or vehicle used in the wet design layers 6 of the present invention is another element of this invention. Thus, the printing medium in this case should be formed from one or more of such materials as drying oils, varnishes, or resins, which preferably have a viscosity of less than about 45 Stokes. In a most preferred embodiment a linseed oil varnish having a viscosity of less than about 45 Stokes, such as blown linseed oil having a viscosity of 36.2±poise, it is possible to apply greater amounts of color in accordance with the wet printing step of the present invention than has previously been permissible. As for the specific resins having these properties, they can be resins such as alkyds, phenolics, urea-formaldehydes, melamine-formaldehydes, polyesters, melamine alkyds, vinyls, and acrylics. Various additives may be incorporated into the vehicles such as dryers, promoters, and/or accelerators. In a preferred embodiment, the vehicles can be alkali-refined linseed oil, tung oil, modified vinyl or styrene linseed oil bodied with modified phenolic resins, polyurethane resin, modified soybean oils, polymerized linseed oil, oxidized linseed oil, boiled linseed oil, and semi-oxidized linseed oil.

The oxide coloring agents preferably used in the design layers hereof comprise ceramic pigments, generally having an average particle size within the range of from about 0.10 to about 7 microns, preferably from about 0.3 to about 4 microns, which are incorporated into the binder vehicles discussed above. Preferably, the pigments are metallic oxides of fine particle size, such as an average particle size of less than about 1 micron. The pigments which may be used and the manner of their use are known to those skilled in this art. The oxide of the following elements are mentioned merely by way of example of some suitable ceramic pigments and the colors obtainable therefrom.

| Oxides of | Color |
|---|---|
| Fe, Cr, Zn | Brown |
| Co, Cr, Al | Blue |
| Cr | Green |
| Pb, Sb, Zn | Yellow |
| Cd, Zn | Yellow |
| Cd, Zn, Se | Red |
| Co, Fe, Cr | Black |

These ink formulations may be varied depending on the oxides employed, as is well known to those skilled in this art, some typical ink formulations wherein the parts are expressed as parts by weight are as follows:

| | Wt. % | | |
|---|---|---|---|
| Black cobalt, iron, and/or chromium | | | 65 |
| Blown linseed oil | 50 | | |
| Lead drier | 2 | | 35 |
| Manganese Drier | | 1 | |
| Red cadmium and/or selenium | | | 75 |
| Blown linseed oil | 50 | | |
| Lead drier | 2 | | 25 |
| Manganese drier | 1 | | |

A second coating layer 8 is then applied over the design layer 6 of the decalcomanias 1 of the present invention. This second coating layer, or "covercoat," 8 acts as a carrier for maintaining the integrity of the decal during its transfer from the backing sheet 2 to the textile 10 itself. In addition, the layer should be non-textile yellowing so that it will not interfere with the color values provided by the design layer after application. Within these parameters, however, a rather broad range of these cover coats or lacquer layers can be provided, and, in fact, the specific composition of the various components thereof can be precisely the same as those spelled out above in connection with the first coating layer hereof. In addition, they can optionally include a flux layer such as that which has been employed to bind or fuse any glass-free metallic oxide used in the design layer. In other respects, the second coating layer can be similar to the first coating layer, and can include the same solvents, acrylic components, cellulosic derivatives, and liquid plasticizers as are set forth above. As for the liquid plasticizers, however, it is more significant in connection with the second coating layer to employ such plasticizers therein. In particular, it is thus preferred that such plasticizers be used in the second coating layer or "cover coating" to render it flexible and in order to prolong the life thereof. Thus, without the use of such plasticizers, this coating layer can eventually become brittle and fracture particularly during transfer of the decal. One such preferred composition is a hydroxy-modified resin sold by Neville Chemical Company under the name NEVILLAC 10® (NP-10). Additionally, starch purity 21 can be employed also as a plasticizer, but with a slightly different purpose. That is, this plasticizer is a non-drying material which is significant in adding a non-blocking agent thereto. The starch thus becomes a matting or flattening agent to reduce the gloss or shiny surface of the applied decal, which is particularly important in connection with the textile substrates in connection with which these decals are to be employed.

In order to prepare the decalcomanias of the present invention, the first coating layer 4 of the present invention is initially prepared and applied to a backing sheet 2, such as a dextrine-coated paper sheet, by means of a conventional screen printing technique. This layer 4 is applied to the backing sheet 2 at a thickness of between about 3 and 10 microns, but at least about 8 microns thick.

It is then possible to wet print the design layer 6 according to conventional wet printing techniques directly onto the coating layer 4 hereof. These conventional techniques include screen printing or offset lithography in which the wet design layers as discussed above are applied thereto. The four-color offset printing technique is preferably used in this step of the process hereof. Finally, the second coating layer 8 of the present invention can then be applied over the design, again by various methods such as silk screening, offset printing, or by printing a clear film over the design, and by dusting a prefused flux over the film when such a flux is to be utilized. If desired, that dusting operation can be eliminated by incorporating the flux into a film such as a printing varnish, oil or resin.

As discussed above, application of this decalcomania to the porous substrate 10 follows application of the aforedescribed bonding agent 12 to the textile surface. Upon removal of the backing layer, the decalcomania 1 is then applied directly to the bonding agent 12 itself. Because of the softening of certain of the porous surfaces 10, such as acrylic fibers in canvas surfaces or the like, as well as the softening of the first coating layer of the decalcomania, excellent adhesion and application of the decalcomania and the design layer thereof is then effected.

As for the bonding agent 12 of the present invention, application of same to the porous surface 10, such as canvas, can be accomplished by a number of methods including brushing, spraying, or roller coating. Once the decalcomania 1 itself has been placed on that surface over the bonding agent 12, which is in a wet state, the decal can then be positioned or moved into correct or desired location thereon.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A decorated porous surface comprising a porous substrate, a layer of bonding agent disposed on said porous substrate, said bonding agent comprising a fast-acting solvent, a moderating agent and a thickening agent, and a decalcomania disposed on said layer of bonding agent, said decalcomania comprising a first coating layer absorbed at least partially into said porous substrate, a design layer comprising at least one pigment disposed on said first coating layer, and a second coating layer disposed on said design layer wherein said porous surface is selected from the group consisting of textiles, wood and masonite.

2. The decorated porous surface of claim 1 wherein said porous surface comprises a textile surface.

3. The decorated textile surface of claim 2 wherein said textile substrate comprises canvas.

4. The decorated textile surface of claim 3 wherein said canvas comprises acrylic fibers, said first coating layer being absorbed at least partially into said acrylic fibers.

5. The decorated textile surface of claim 1 wherein said fast-acting solvent is selected from the group consisting of lower alcohols, ether alcohols, ketones, esters, terpene solvents, aliphatic hydrocarbons, aromatic hydrocarbons, nitrogen-containing heterocyclic compounds, and mixtures thereof.

6. The decorated textile surface of claim 1 wherein said moderating agent is selected from the group consisting of polyhydroxy compounds, secondary and tertiary terpene alcohols, water solubilized oils, water, and mixtures thereof.

7. The decorated textile surface of claim 1 wherein said thickening agent is selected from the group consisting of cellulosic compounds, polyvinyl alcohol, carboxy vinyl polymers, casein, acrylic resins, dextrines, alginates, gums, and mixtures thereof.

8. The decorated textile surface of claim 1 wherein said moderating agent comprises a polyhydroxy alcohol containing from 2 to 12 carbon atoms.

9. The decorated textile surface of claim 1 wherein said polyhydroxy alcohol comprises hexylene glycol.

* * * * *

UNITED STATES PATENT AND TRADEMARK OFFICE

CERTIFICATE OF CORRECTION

PATENT NO. : 5,229,201

DATED : July 20, 1993

INVENTOR(S) : Louis A. Blanco

It is certified that error appears in the above-indentified patent and that said Letters Patent is hereby corrected as shown below:

Column 8, line 5, after "the" insert --colorant, and most preferably greater than about 60 wt. %--.

Column 9, line 3, ""covercoat," 8" should read --"covercoat" 8,--.

lines 6-7, delete "non-textile yellowing" and insert therefor --non-yellowing--.

line 67, after "layer" insert --2--.

Signed and Sealed this

Nineteenth Day of April, 1994

Attest:

BRUCE LEHMAN

*Attesting Officer*

*Commissioner of Patents and Trademarks*